July 3, 1934.    H. L. GUY    1,965,412
BOLT AND NUT STRUCTURE
Filed Jan. 13, 1933
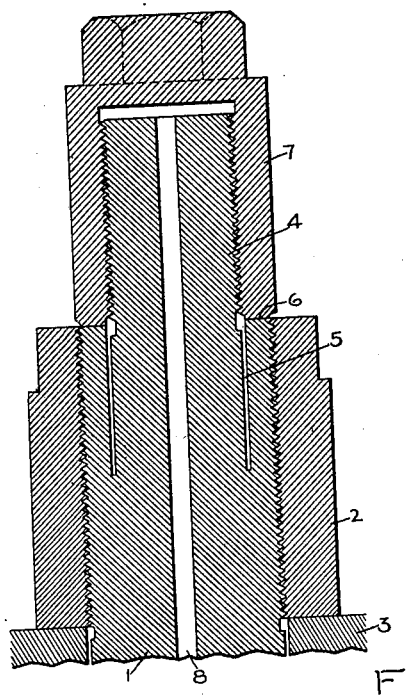
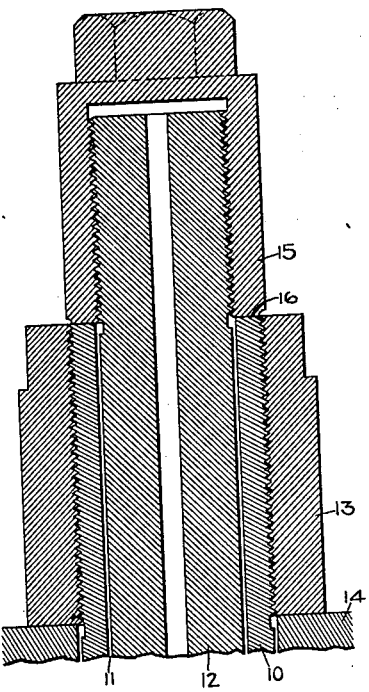
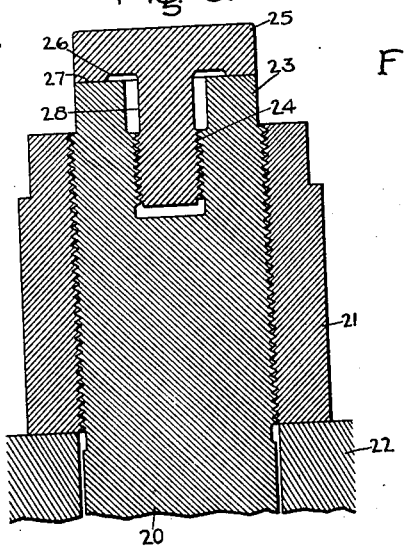
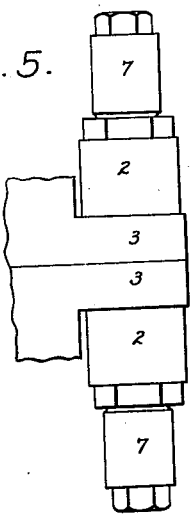
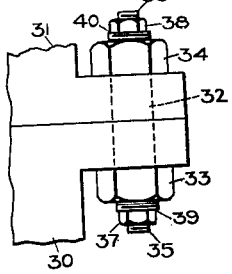
Inventor:
Henry L. Guy,
by Chas. H. Allen
His Attorney.

Patented July 3, 1934

1,965,412

UNITED STATES PATENT OFFICE 1,965,412

BOLT AND NUT STRUCTURE

Henry L. Guy, Hale, England, assignor to General Electric Company, a corporation of New York Application January 13, 1933, Serial No. 651,609
In Great Britain January 27, 1932

5 Claims. (Cl. 85—1)

The present invention relates to bolted structures including nuts and bolts and is particularly intended for use with heavy bolts which are subjected to great stresses.

In designing bolts the diameter is, according to ordinary mechanical principles, determined in accordance with the stress which the bolt has to withstand. However, the diameter of a bolt designed to withstand great stresses may be increased to such an extent that when the nut is screwed on the stress is not distributed uniformly over the whole section of the bolt that is from the circumference to the center thereof, but the stresses in the circumferential portion of the bolt near the bearing face of the nut are considerably greater than those in the axial portion. Furthermore the pressure between the threads of the nut and bolt which are next to the bearing face of the nut is greater than that between the other threads of the nut and bolt which are in engagement. The result is that in a heavily stressed bolt the fraction of the total load borne by the first engaging threads of the nut and bolt are greater than the load borne by the second threads and so on. The progressive decrease in the load carried by consecutive threads results in different elastic extensions of the pitch of the individual turns of the thread. If the resulting stresses cause plastic flow, either by the stress at normal temperature exceeding the elastic limit or at higher temperatures exceeding the creep limit, changes will take place in pitch which vary from thread to thread. Consequently when attempts are made to unscrew the nut, seizing may take place because threads of one pitch are made to engage with others of different pitch.

The general object of my invention is to provide an improved structure and arrangement for bolts and nuts whereby a more uniform distribution of stresses in the bolts and nuts is obtained.

According to the present invention means are provided for reducing in the outer portion of the bolt, the stress transferred thereto from the bearing face of the nut. The stress may be reduced by directly transferring to the central portions of the bolt a part of the stress, or by providing one or more auxiliary bolts for carrying a part of the stress. With such an arrangement, the whole stress is transmitted through the bearing surface of the first nut partly through the outer circumferential portion of the material of the bolt and partly through a second nut which bears upon the end of said outer circumferential portion of the bolt either directly to the central portions of the bolt or to the second bolt which passes through an axial hole in the first bolt.

For a better understanding of what I consider to be novel and my invention, attention is directed to the following description and the claims appended thereto in connection with the accompanying drawing.

In the drawing, Figs. 1, 2, 3 and 4 show several structures embodying my invention, and Fig. 5 shows the structure of either Fig. 1 or Fig. 2 applied to a pair of flanges for holding them together.

Referring to Fig. 1, a bolt 1 has screwed on its upper end a nut 2 which seats on a flange or support 3 constituting a part of a structure from where a load is transmitted by the bolt. For example, as shown in Fig. 5, bolt 1 is used to fasten together two flanges 3. At the upper end of the bolt a coaxial portion 4 is formed which is of smaller diameter than the bolt 1 and is separated therefrom between its root and its upper end by a relatively thin annular groove 5 cut into the annular surface 6 of the bolt. The portion 4 is screw-threaded and is provided with an auxiliary nut 7, the face of which seats on the annular surface or shoulder 6 of the bolt 1. The bolt 1 may be drilled throughout its length to define a central bore 8. The nut 2 which is applied to the flange 3 transmits the full pressure which the bolt is required to withstand, and the nut 7 is tightened up so that its bearing surface is applied with a determined pressure to the annular surface 6 of the bolt. Thus the entire bolt tension is directly transmitted from the bolt to the nut 2. The outer nut 7 merely serves to distribute the bolt tension more uniformly throughout the cross section of the bolt and also along the entire threaded portion of the bolt engaging the nut 2. The nut 7 is independent from the nut 2 in that it does not engage and is not connected to the latter.

The effect of this construction is that a part of the stress applied to the bearing face of the nut 2 is transmitted directly as a tensile stress to the outer circumferential portion of the bolt 1, and the remaining stress is transmitted by pressure through the bearing surface of the auxiliary nut 7 directly to the inner portion 4 of the bolt. The stress is thus substantially equalized over the entire cross-section of the bolt, and furthermore, the pressure on the threads of the main nut 2 and the part of the bolt 1 with which it is in engagement will be substantially uniform throughout the length of the thread instead of being concentrated on the first threads nearest the bearing surface of the nut.

Whereas I have shown in Fig. 1 an arrangement in which the interior portion of the bolt to which a part of the stress is transferred forms an integral part of the bolt, I have shown in Fig. 2 an arrangement in which these two parts, that is the outer portion of the bolt and the innner portion of the bolt are separated, or from another viewpoint form an arrangement in which two or more bolts are concentrically arranged.

More specifically, a bolt 10 has a bore 11 in which is inserted another bolt 12. A nut 13 is screw-threaded onto the bolt 10 and bears against a flange or support 14. The bolt 12 extends beyond the bore 11 in bolt 10 and has its end portions screw-threaded and provided with a nut 15 bearing against the face 16 of the outer bolt 10. Any desired distribution of the force applied to the two bolts can be obtained by more or less tightening of the nut 15 on the inner bolt 12. I have shown one end only of the nut and bolt arrangement; the other end thereof may be symmetrical to the first end.

In the arrangement illustrated in Fig. 3 a bolt 20 is provided with a nut 21 bearing against a flange or support or like machine part 22. The upper end 23 of the bolt has a threaded hole 24 coaxial with the bolt and extending a short distance therein. A head plug 25 is screwed into the hole 24. The bearing face of the plug 25 is undercut, as shown at 26, to form a circumferential portion 27 which is applied with a determined pressure to the outer annular portion of the bolt 20. An upper portion 28 of the shank of the plug 25 is somewhat reduced in diameter. In this arrangement the stress transmitted through the nut 21 is in part transmitted through the annular end face of the plug and the screw-threaded portion of the plug to the inner and central portions of the bolt 20. Also in this arrangement the pressure applied to the threads of the bolt is more uniformly distributed among the different turns or threads.

In Fig. 4 I have shown two flanged conduit portions 30 and 31 fastened together by a bolt 32. Two nuts 33 and 34 are screw-threaded on the bolts and bear against the flanges 30 and 31 respectively. The two ends 35 and 36 of the bolt are reduced in diameter with respect to the remaining portion of the bolt and provided with nuts 37 and 38 respectively bearing against the annular surfaces or shoulders 39 and 40 of the bolt with a determined pressure.

Having described my invention, together with constructions which I now consider to represent the best embodiment thereof, I desire to have it understood that the constructions shown are only illustrative and that the invention may be carried out by other means.

What I claim as new and desire to secure by Letters Patent of the United States is:

1. In a bolt and nut structure, the combination of a bolt having a screw-threaded portion and another screw-threaded portion reduced in diameter with respect to the first-named portion, a nut on the first portion and another nut on the other portion independent from the first named nut to bear with a determined pressure against an annular surface of the bolt intermediate the two screw-threaded portions.

2. The combination of a support, a bolt having an axial cylindrically shaped bore, a nut on the bolt bearing against the support for transmitting the entire bolt tension to the support, another bolt extending through the bore of the first-mentioned bolt, a nut on the other bolt bearing against a face of the first-named bolt with a determined pressure.

3. In a bolt and nut structure, the combination of bolt means having a screw-threaded intermediate portion and a screw-threaded end portion reduced in diameter with respect to the diameter of the intermediate portion, a nut on the intermediate portion, and another nut independent of the first named nut being provided on the end portion to bear with a determined pressure against an annular face defined by the outer end of the intermediate portion.

4. In a bolt and nut structure, the combination of bolt means having a screw-threaded intermediate portion and a screw-threaded end portion reduced in diameter with respect to the diameter of the intermediate portion, a nut on the intermediate portion, and another nut on the end portion bearing with a determined pressure against an annular face defined by the outer end of the intermediate portion, an outer part of the intermediate portion being spaced from a central portion thereof to render said outer part more flexible.

5. In a bolt and nut structure, the combination of bolt means having a screw-threaded intermediate portion and a screw-threaded end portion reduced in diameter with respect to the diameter of the intermediate portion, a nut on the intermediate portion, and another nut on the end portion bearing with a determined pressure against an annular face defined by the outer end of the intermediate portion, a deep annular groove being cut into said annular face to render the intermediate threaded portion more flexible.

HENRY L. GUY.